April 17, 1945.  R. D. PIKE  2,373,911
PRODUCTION OF MAGNESIA AND CALCIUM CARBONATE FROM DOLOMITE
Filed July 18, 1941
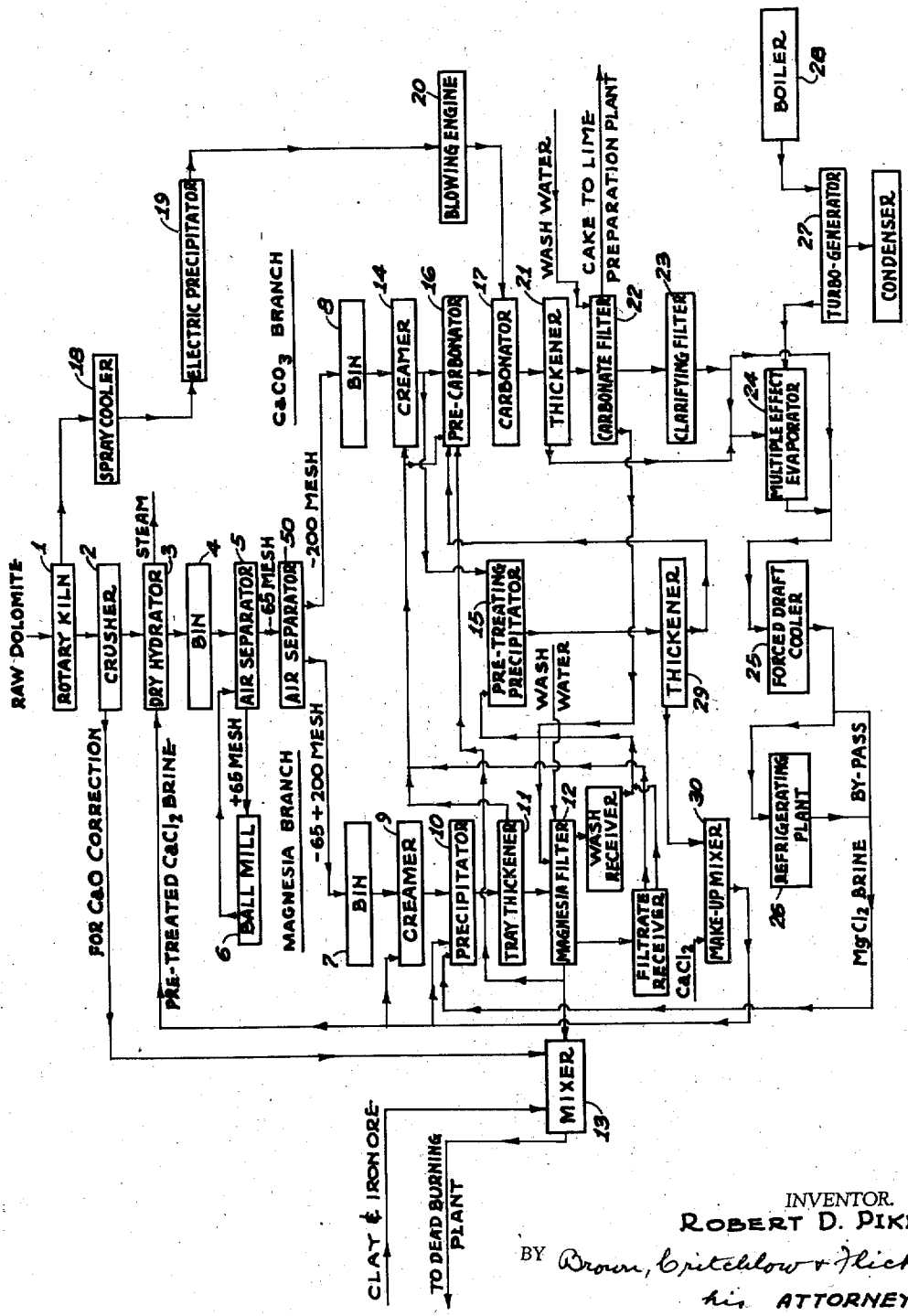
INVENTOR.
ROBERT D. PIKE.
BY Brown, Critchlow & Flick
his ATTORNEYS.

Patented Apr. 17, 1945

2,373,911

UNITED STATES PATENT OFFICE 2,373,911

PRODUCTION OF MAGNESIA AND CALCIUM CARBONATE FROM DOLOMITE

Robert D. Pike, Pittsburgh, Pa., assignor to Harbison-Walker Refractories Company, Pittsburgh, Pa., a corporation of Pennsylvania Application July 18, 1941, Serial No. 402,935

24 Claims. (Cl. 23—66)

This invention relates to the treatment of dolomite for recovering valuable products therefrom.

Because of its chemical constitution and wide distribution, dolomite affords a desirable potential source of magnesia suited to the various uses to which magnesia is put, such as production of refractories. It is known that if calcined and hydrated dolomite is treated with magnesium chloride (MgCl$_2$) brine hydrated magnesia [Mg(OH)$_2$] is precipitated with production of a brine containing calcium chloride (CaCl$_2$) according to the equation:

Reaction I
$$Ca(OH)_2 + MgCl_2 = Mg(OH)_2 + CaCl_2$$
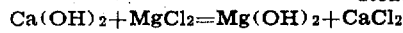

It is known also that the magnesium chloride necessary for that reaction may be regenerated by reacting the calcium chloride mother liquor with calcined and hydrated dolomite and carbon dioxide (CO$_2$) whereby precipitated chalk, or calcium carbonate, (CaCO$_3$) is formed together with a magnesium chloride brine which may then be recycled for the production of further amounts of hydrated magnesia in accordance with Reaction I. The reactions follow:

Reaction II
$$Mg(OH)_2 + CaCl_2 + CO_2 = CaCO_3 + MgCl_2 + H_2O$$
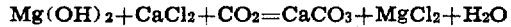

Reaction III
$$Ca(OH)_2 + CO_2 = CaCO_3 + H_2O$$
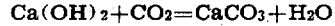

The precipitated chalk is separated from the mother liquor, which is then recycled for use in Reaction I. It has been proposed to use Reaction II in a non-cyclic process for the production of MgCl$_2$ from magnesia and CaCl$_2$.

By the use of those reactions there would thus be provided a cyclic process of producing magnesia and calcium carbonate from dolomite. The chemisty of such a process is so simple and the materials necessary are so common and cheap as to render the process highly attractive and a first line of investigation in attempting to produce magnesia from dolomite. In fact, numerous proposals have been made to such ends, and processes of the general class utilizing the reaction between magnesium chloride and hydrated lime (Reaction I) for the precipitation of hydrated magnesia and the production of calcium chloride, coupled with reactions between hydrated calcined dolomite, calcium chloride and carbon dioxide (Reactions II and III) for the regeneration of magnesium chloride and the production of calcium carbonate have been patented, typical United States patents being No. 266,970, to Closson, No. 1,031,502, to Zies, and No. 1,541,116, to Clerc et al.

Despite the theoretically attractive character of such a cyclic process, however, the proposals of the prior art have not received commercial recognition because it has not been possible to operate them satisfactorily or economically on a commercial scale, or to make magnesia of required purity. This situation is due to the fact that up to the time of this invention numerous unsolved problems have been encountered, chief among which have been the inability to produce precipitates of Mg(OH)$_2$ and CaCO$_3$ which can be separated easily, quickly and cheaply from the mother liquors, to produce magnesia with an acceptably low content of lime, or to produce lime with an acceptably low content of magnesia. Also, prior processes failed to reduce losses of calcium and magnesium chlorides in the cycling brine to within economical limits, to maintain a stable relation between magnesium and calcium chlorides in the cycling brine, and to minimize evaporation of water necessary to maintain the circulating brine at proper concentration.

A primary object of my invention is to provide a simple and practical cyclic process of the type referred to hereinabove which overcomes the foregoing problems and affords a simple, practical and economical mode of treating dolomite to produce high-grade magnesia.

A particular object is to provide a process of producing magnesia and calcium carbonate from dolomite of the type which involves treatment of calcined and hydrated dolomite with magnesium chloride to produce, by reaction with hydrated lime, a precipitate of hydrated magnesia which together with the magnesia content of the dolomite is recovered from the resultant mother liquor, i. e., a brine containing calcium and magnesium chlorides, in accordance with which there is produced a quick settling and freely filtering granular hydrated magnesia in a state of high purity, and which is easily practiced and controlled, and is economical.

A further object of the invention is to provide a method of regenerating the mother liquor, i. e., a brine containing magnesium and calcium chlorides, from the foregoing process, in such manner as to maintain the necessary stable relationship between the magnesium and calcium chlorides, and to avoid losses thereof.

Yet another object is to provide a simple and efficacious process of producing calcium carbonate from dolomite by reacting hydrated magnesia, calcium chloride and carbon dioxide, to produce a precipitated chalk that is rapid settling and free filtering, and which contains at least about 96 per cent of calcium carbonate and not over about 2 per cent of magnesia.

A further object is to provide a process of producing, in the cycle of a process of the type contemplated by the invention, a pure calcium chloride brine such as is used in certain steps of the process.

Still another object is to provide a cyclic process of producing magnesia and calcium carbonate from dolomite by combining the processes which form the foregoing objects and which embodies their stated advantages.

Other objects will appear from the following description.

It is essential to the attainment of the objects of the invention that the material treated with magnesium chloride be in granular and dry hydrated form, and further that dispersion of hydrated magnesia which is precipitated on and within the granules be minimized. To this end the dolomite is calcined at a temperature such as not only to convert the calcium and magnesium carbonates to oxides, but also such that the lime is highly active, i. e., slakes rapidly and vigorously. In this condition the magnesia also slakes quite rapidly but somewhat less so than the lime.

The calcined material is then hydrated, and it is important in the practice of the invention that this step be conducted in a particular manner. Ordinary wet hydration, as known to the prior art, does not suffice because, as I have found, wet hydration inevitably results in a non-granular hydrate and a slow filtering hydrated magnesia. Likewise, the dry hydration procedures known to the prior art do not suffice because they adversely affect the filtering properties of the magnesia.

In accordance with this invention the calcined dolomite is treated with a calcium chloride brine which is free, or substantially free, from magnesium chloride, in an amount to effect hydration of substantially all of the lime and produce a dry hydrated product of which at least about 50 to 60 per cent is granular. I have discovered that not only is dry hydration in such manner critical, but also that the concentration of the calcium chloride brine is critical in attaining the benefits of my invention. It should be of about 1.05 to 1.08 specific gravity (at ordinary room temperature, say about 70° F.), and preferably its specific gravity is about 1.065. Concentrations appreciably below or above the range stated result in the production of slow settling hydrated magnesia in the following stages of the process. The amount of calcium chloride supplied by the brine should not greatly exceed the amount necessary for hydration of the CaO because $CaCl_2$ is hygroscopic and may interfere with appropriate classification of the hydrated material. Using calcium chloride brines of the concentrations stated I preferably use about 38 to 40 per cent by weight of the calcined dolomite, which results in a hot, dry hydrated material which contains at least about 50 per cent of granular material and about 18 per cent by weight of water of hydration corresponding to complete hydration of the lime and about 17 to 18 per cent hydration of the magnesia. Much heat is liberated during hydration, and as will appear hereinafter, it is advantageous for that reason to hydrate at this stage of the process.

The word "granular" is used herein to refer to particles larger than 325 mesh, and most suitably larger than 200 mesh, and advantageously not appreciably greater than 65 mesh. Such material has the appearance of fine granulated sugar. Such granular material is suitable for use in producing hydrated magnesia in accordance with the present invention by Reaction I, while particles finer than 325 mesh are too fine for successful use. The fines are, however, used in the calcium carbonate branch of my process (Reaction II), as will appear. A hydrated material all the particles of which are smaller than 150 mesh is quite unsuitable for use in producing magnesia by the process described herein.

Although the foregoing treatment produces a dry hydrated granular material, this does not wholly suffice for the production of a rapid settling and free filtering magnesia, it being critical also to minimize dispersion of the hydrated magnesia produced in Reaction I. In accordance with the invention this is accomplished, in part, by creaming the granular dry hydrated material (−65 to +200 mesh) with a further amount of the calcium chloride brine described above to produce a lump-free slurry. I have found that the use of pure calcium chloride brine, instead of water or of brine containing magnesium chloride, is critical in this stage and in the hydration stage if the results which characterize the invention are to be attained. As little as 0.4 per cent of $MgCl_2$ in the $CaCl_2$ brine used in the hydrating and in this creaming step is highly injurious to the settling and filtering properties of the hydrated magnesia which is subsequently formed, consequently the brine should be substantially free of $MgCl_2$.

The function of the creaming is to produce a lump-free flowable cream which is immediately subjected to Reaction I without introducing any condition to cause dispersion of the $Mg(OH)_2$. I have found that it is desirable to use the appropriate amount of brine required to produce smooth flowable cream and have obtained satisfactory results with solid concentrations in the cream of about 35 per cent to 47 per cent. Preferably this cream is made quickly by employing strong agitation, and I have obtained satisfactory results in as little as 30 seconds and prefer to produce the cream in not more than about 2½ minutes. I prefer also to supply the brine used for creaming at or about the temperature of the main stream of brine entering the precipitator where Reaction I takes place.

The cream thus produced is then ready for reaction with the magnesium chloride brine to effect, according to Reaction I, precipitation of $Mg(OH)_2$. The amount of magnesium chloride used and the temperature of reaction are, as I have discovered, critical factors in carrying out this step of my invention. As to the first of these factors, I have found that the amount of brine used in the precipitating reaction should be far in excess of the theoretical requirements; in fact, according to this invention the excess is preferably not less than about 105 per cent of the amount stoichiometrically necessary, which is several times the excess recommended by any prior art proposal known to me. Larger amounts may be used, and in fact I have satisfactorily produced fast settling and free filtering $Mg(OH)_2$ using as much as 140 per cent excess magnesium chloride. However, as the excess of magnesium chloride is increased it becomes necessary to circulate larger volumes of cycling brine in the process, which is economically undesirable, and such extremely large excesses may adversely affect the filtering properties of the calcium carbonate which is precipitated in regenerating the brine according to Reaction II. Consequently I now prefer to work close to 108 per cent excess $MgCl_2$, but my process can be operated satisfactorily with excess $MgCl_2$ as high as 140 per cent. The excess of magnesium chloride is not only critical in conducting Reaction I, but also, as will appear, it contributes importantly to the production of a calcium carbonate of good settling and filtering properties in conducting Reaction II to regenerate the cyling brine.

In the application of Reaction II to regeneration of the brine resultant from Reaction I considerable heat is liberated so that normally the cycling brine would return to the magnesia branch at a relatively high temperature. I have discovered, however, that to produce the rapid settling and free filtering $Mg(OH)_2$ which characterizes the present invention it is necessary that the brine enter the magnesia precipitator at a temperature not over about 60° F., and most suitably not over about 55° F. It is for this reason that release and dissipation of the heat of hydration in the initial dry hydrating step is important. The use of such a low temperature is contrary to all of the prior art teachings with which I am familiar. Although still lower temperatures might be used, the results obtained by supplying the brine to the precipitator at a temperature of about 55° F. are so highly satisfactory that there is no particular advantage in cooling the brine further, especially because that would only entail the cost of the additional refrigeration needed.

I have found also that for the best results Reaction I should be carried out at a quite constant temperature. Heat is released in this reaction in an amount sufficient to raise the brine temperature about 7° F., and during hot weather the rise may be as great as 10° to 12° F. Ideally, the temperature should be kept constant during Reaction I, but I have found that satisfactory results are had if the temperature rise is limited to a maximum of about 4° to 6° F., and to this end the precipitators may be provided with coils for the circulation of cooling brine.

The magnesium chloride brine needed for Reaction I is produced by applying Reaction II to regeneration of the mother liquor formed in the former reaction. The regenerated brine will contain, however, some proportion of calcium chloride. I have found that the concentration of the brine used for precipitating $Mg(OH)_2$ by Reaction I is likewise an important factor in controlling the settling and filtering qualities of the precipitated magnesia. The brine should have a specific gravity of about 1.10 to 1.14, and as produced by the procedure to be described hereinafter it will contain about 11 per cent of $MgCl_2$ and 3 per cent of $CaCl_2$.

Through this combination of factors there is produced a hydrated magnesia which is precipitated on and within the granules which enter the precipitator so that the product settles rapidly and filters easily. However, the precipitated material should not be allowed to stand long in contact with the mother liquor, otherwise dispersion of the precipitated magnesia may occur and that will impair the filtering properties. Consequently, the magnesia should be separated from the mother liquor, as by thickening and filtration, with reasonable promptitude.

A process of this type results in the production of a magnesia containing more than 96 per cent of MgO and not over about 2 per cent of CaO, calcined basis. When calcined gently, this material, as I have found, is exceptionally active. In fact, lightly calcined magnesia produced as described is about as active as quicklime. This is contrary to prior beliefs in the art, it having been thought that a chemically produced magnesia in granular form is relatively inactive, and that granular form and activity are not concomitantly obtainable.

I have found that for satisfactory operation in regenerating the magnesia branch mother liquor, and in conducting a cyclic process, it is important prior to carbonation to produce $CaCO_3$, to convert the $Ca(OH)_2$ to $CaCl_2$ by using the mother liquor according to Reaction I (pre-carbonating step), and then to apply Reaction II. Hence, the mother liquor from Reaction I is regenerated, and a free settling and rapid filtering $CaCO_3$ of high purity is produced by treating the hydrated dolomite fines with the mother liquor from the magnesia branch to produce a slurry of hydrated magnesia produced by reaction of the $MgCl_2$ contained in the cycling brine with all, or substantially all, of the hydrated lime contained in the fine portion of the hydrated dolomite. Upon completion of this reaction there should be present in the brine about 0.6 per cent of $MgCl_2$, and the $CaCl_2$ content should be about 20 to 30 per cent in excess of the requirements of the ensuing carbonation reaction. Preferably this pre-carbonating operation is conducted by creaming the hydrated dolomite fines with a portion of the magnesia branch mother liquor in the manner described in connection with the creaming step of the magnesia branch, yielding a smooth flowable cream containing 20 to 25 per cent of solids, the reaction then being completed by addition of the remainder of the mother liquor. This resulting slurry is then treated with carbon dioxide whereupon in accordance with Reaction II $CaCO_3$ is precipitated and the brine is regenerated for recycling to the magnesia branch (Reaction I).

In the operation of the carbonate branch (Reaction II) of my process there is a tendency for the calcium chloride content of the cycling brine to build up and for the magnesium chloride content to decrease. The result of this would be ultimately to cause the reactions to stop. I have discovered, however, that the necessary stable relationship between $MgCl_2$ and $CaCl_2$ in the cycling brine may be maintained simply and easily by introducing during the pre-carbonating operation a portion of the hydrated magnesia from the magnesia branch. The amount of magnesia necessary for this purpose will depend upon the degree of disparity between the completion of Reactions I and II. For example, I find that Reaction I goes to substantially 100 per cent completion, while in Reaction II from 2.5 to 5.5 per cent of the MgO remains unreacted, and this disparity leads to a building up of $CaCl_2$ in the circulating brine, at the expense of an equivalent amount of $MgCl_2$.

As noted above, the invention provides a process of producing a pure calcium chloride brine such as is critical in the conduct of the magnesia branch. In accordance with my discovery, a portion of the dolomite fines that have been creamed with the magnesia branch mother liquor is diverted and treated with the calcium chloride brine from the magnesia branch, suitably a portion of the magnesia filtrate and wash water. All of the $MgCl_2$ present in the brine reacts with the cream, or slurry, to produce a calcium chloride sufficiently pure for hydrating and creaming the dolomite used in the magnesia branch. This is recovered as the overflow of a thickening operation, the thickened underflow being returned to the pre-carbonator in the carbonate branch.

The invention may be described in further detail with reference to the accompanying flow sheet, and with reference to data based upon actual treatment of a northwestern Ohio dolomite which is taken by way of example because those dolomites occur in a state of high purity and in enormous amounts at approximately the industrial center of the United States, where calcium chloride, the only other raw material necessary, is readily available in large amounts. A typical dolomite from these deposits will have approximately the following analysis:

|        | Per cent |
|--------|----------|
| CaO    | 30.31    |
| MgO    | 21.49    |
| SiO₂   | 0.35     |
| R₂O₃   | 0.36     |
| Ign. loss | 47.40 |

Having reference to the flow sheet, raw dolomite is calcined, or caustic burned, suitably in a rotary kiln 1 to convert the carbonates to oxides at a temperature such that the lime is very active. A dolomite of the type referred to may be calcined for this purpose at a temperature of about 2450° to 2550° F. Suitably the material is in the form of lumps, from which fines have been removed, grading from about ¾ inch to 1¾ inch size. The calcine is cooled and then crushed in a crusher 2 to prepare it for dry hydrating in a hydrator 3 of conventional type with a calcium chloride brine substantially free from magnesium chloride and of about 1.05 to 1.08, and most suitably about 1.065, specific gravity. The amount of brine used should be such as to hydrate substantially all of the CaO and only a minor proportion of the magnesium but at the same time to produce a dry hydrated product containing at least 50 per cent of granular material, as defined above. Satisfactory results are obtained by using such a brine in an amount equal to about 38 to 40 per cent by weight of the calcined dolomite. The dry hydrated material may then be passed to a storage bin 4. Advantageously the hydrated material is aged for a period of time, say over night, as this helps to avoid dispersion of magnesia, apparently by improving the cementing action described hereinafter.

The dry hydrated material is then classified to separate the granular material, i. e., particles not greater than 65 mesh and not smaller than 325 mesh, and most suitably between −65 and +150 to +200 mesh, from the fines, i. e., particles preferably finer than 150 to 200 mesh. This may be accomplished in various ways, as by an air separator 5 from which the material greater than 65 mesh is diverted to a grinder 6, such as a ball mill, where it is gently ground and returned to the air separator to produce material all of which passes a 65-mesh screen. The −65 mesh material is then passed to a second air separator 50 which is preferably so operated as to split on about a 150 to 200-mesh screen, thus producing a granular fraction between about 65 mesh and 150 to 200 mesh, which is passed to a bin 7, and a fines fraction smaller than 150 to 200 mesh, which is passed to a bin 8. Operating in the manner described, about 48 to 50 per cent of the hydrated calcines will be granular and will pass to bin 7. Although I now prefer to operate in the manner just indicated, with a sharp cut in particle size between the granular and the fines fractions, it will be understood from what has been said earlier in the application that there may be some overlapping of particle sizes of the two fractions; in every case, however, the particles of the fines fraction average finer than those of the granular fraction, and the average will pass a mesh substantially finer than the mesh retaining the average of the granular fraction. Where the expressions "granular" or "coarser" and "non-granular," "finer," or "fines" fraction are used in this specification and claims, the expressions are understood to have the above significance.

The invention may be described further with reference to the production of 100 tons per day of 85 per cent magnesia, i. e., of dead burned magnesia whose composition has been adjusted by additions to suit it to refractory purposes. Suitably there will pass to bin 7 about 145 pounds of granular material, and to bin 8 about 148 pounds of fines, both per minute.

The granular material from bin 7 and a further amount of the pure CaCl₂ brine are passed to a container 9 provided with means, such as a Patterson agitator, for strongly agitating the contents to produce a smooth cream rapidly, containing about 35 to 47 per cent of solids. With a feed per minute to the creamer of about 144.5 pounds of granular hydrate and about 36 gallons of 1.065 sp. gr. calcium chloride brine creaming should be finished in about 30 seconds to 2.5 minutes.

The cream, or thick slurry, from creamer 9 passes then to a precipitator 10 where it is agitated gently while introducing a MgCl₂ brine, regenerated as described later in the calcium carbonate branch, at the rate of about 287 gallons per minute. This brine preferably has a specific gravity of about 1.123 and contains about 11 per cent of magnesium chloride and 3 per cent of calcium chloride, although its specific gravity may range from about 1.10 to 1.14 due to permissible variation in the water content. There is also supplied to precipitator 10 a small adjusting stream of about 12 gallons per minute of the pure CaCl₂ brine, which represents merely the excess over that necessary for hydrating and creaming that results from the calcium chloride make-up that is described hereinafter. This excess is thus conveniently handled in this way. Suitably the precipitator comprises three vessels arranged in cascade series, each being provided with means for agitating the contents gently, i. e., only sufficiently to keep the solid material in suspension.

As will be noted, the amount of magnesium chloride used is approximately 108 per cent in excess of that required for reaction with the hydrated lime which enters the precipitator, and may be as high as 140 per cent. The brine is likewise fed at a temperature of about 55° F. An important result of dry hydrating the calcine is that the heat of hydration has been liberated and largely dissipated prior to the precipitation reaction. Consequently less heat is liberated in precipitator 10 than would be the case if hydration were postponed. This is desirable because, as noted above, it is critical in the practice of this process that the temperature of the materials supplied to the precipitator shall be not over, preferably, about 55° F. and that the temperature rise should be limited to a maximum of about 6° F.

The reaction in precipitator 10 is substantially complete in about 20 to 25 minutes, during which time practically all of the hydrated lime has been completely converted to $CaCl_2$ with production of its equivalent $Mg(OH)_2$. The material leaves the precipitator at the rate of about 324 gallons per minute containing about 5.6 per cent of solids and at a pH of 8.2 to 8.6, this alkalinity being the consequence of conducting the operation in the manner described and being employed as a convenient way of confirming the disappearance of substantially all of the $Ca(OH)_2$.

The slurry from precipitator 10 is passed directly to a continuous thickener 11 of conventional type, such as the well-known Dorr tray thickener. To obtain optimum filtering properties the time of residence in the thickener is desirably short, say not more than about 30 minutes. The hydrated magnesia settles at the rate of about 6 to 10 feet per hour so that with a liquid depth of each tray of approximately 3 feet the thickening step can be conducted adequately in 30 minutes.

About 30 per cent, e. g., about 96 gallons per minute, of the underflow from thickener 11 passes in the form of a thickened slurry to a filter 12, preferably of the continuous rotary vacuum type, and due to the properties of the magnesia, filtering and washing are very rapid. For this purpose there are used about 31 gallons per minute of the weak end of the wash from the wash from the calcium carbonate filter, and about 75 gallons per minute of fresh wash water. The cake amounts to about 180 pounds per minute.

The washing and filtering rate of the hydrated magnesia cake are so rapid that for a plant producing 100 tons per day of 85 per cent dead burned magnesite the drum area of filter 12 need be only about 300 square feet, corresponding to a rate of about 0.6 pound of dry solids per square foot of filter area per minute, which is an exceptionally rapid filtering rate. I prefer to regulate the rotation of the filter drum so that the thickness of the cake will be from about 3/8" to 1/2", but may operate successfully with cakes twice as thick as this.

The washed cake from filter 12 contains only about 2 to 3 per cent of soluble chlorine as magnesium and calcium chlorides, and upon calcination it contains about 1 to 2.0 per cent of CaO which arises chiefly from decomposition of the calcium chloride present. Any magnesium chloride present is decomposed, of course, in calcining to increase the content of magnesia. The decomposition of these chlorides liberates hydrogen chloride. This loss of chlorine accounts almost entirely for the calcium chloride make-up which is described hereinafter.

The cake has an ignition loss of about 32.5 per cent, showing that the magnesia is completely hydrated to $Mg(OH)_2$. The cake may be calcined to produce caustic magnesia. Or, if desired, it may be used for the production of dead burned magnesia, as for use in refractories. For this purpose it may be passed to a mixer 13 where its composition is adjusted according to need, as by adding clay or iron ore in case the dead burned material is to be used for furnace bottoms, or where a portion of the calcined dolomite from crusher 2 may be added to correct the line content according to need. From mixer 22 the material is passed to a suitable furnace, not shown.

I have discovered that the lightly calcined material is almost as active as quicklime. Use may be made of the activity of such caustic magnesia in producing dead burned products in the form of strong granules. Thus, the cake from filter 12, after adjustment of composition if necessary, is calcined at a maximum temperature of, for example, 1000° F., before passing it to a rotary kiln for dead burning. A portion of the calcined material is returned to mixer 13, and the material leaving the mixer is passed through a tumbler to nodulize it, and thence to the calcining furnace and finally to the dead burning kiln. The nodules formed in this manner retain their shape both in the calcining and dead burning furnaces. A nodular feed to a kiln making dead burned magnesia is desirable particularly when the nodules are from 1/4 inch to 1/2 inch in size and do not become reduced to a powder at any stage of their passage through the kiln. Granular dead burned magnesia, or so-called magnesite, is desirable for various purposes, so that this discovery is important.

The essential requirements for the production of hydrated magnesia of such qualities have been enumerated hereinabove. Briefly, the critical factors are that the material treated shall be granular, that it shall have been dry hydrated with a calcium chloride brine substantially free from magnesium chloride, of less specific gravity than that of the circulating brine used for precipitating the magnesia, and of 1.05 to 1.08 specific gravity, that the granular hydrated material shall have been formed into a lump-free slurry of high solids content with a similar calcium chloride brine, that the precipitation shall have been effected with a magnesium chloride brine of substantially the character described above and at a beginning temperature not over about 55 or 60° F., with a rise of temperature in the reaction of precipitation limited to about 6° F., and that the amount of magnesium chloride shall have been at least 105 per cent in excess of the requirements of the reaction. These factors combine to produce a granular hydrated material which when reacted with magnesium chloride according to Reaction I results in precipitation of hydrated magnesia in such manner that the latter is isomorphous with the original granular particles and is not readily or to any substantial extent dispersed from them. The occurrence of such dispersion retards settling and filtration, and this is one of the factors which has prevented prior processes of this type from commercial adoption. By the practice of my invention, however, the precipitated magnesia remains granular in form so that the product settles rapidly and filters freely and may be washed on the filter to a very low content of calcium salt.

All of the factors recited are important, it being not sufficient merely to produce a dry granular hydrate in the first instance because that alone is insufficient to prevent dispersion of freshly precipitated magnesia, and dispersion may occur if any appreciable amount of magnesium chloride is present in the calcium chloride brine used for dry hydrating in element 3 or for creaming in element 9, or unless there are observed the criteria set forth for the precipitating reaction. These factors may be exemplified by the following results obtained by variations from the practice just described.

*Example A.*—Feed of hydrated calcines was from the fine portion of the hydrates instead of from the granular portion. The cake would not filter in any practical length of time. This shows the importance of using granular material for Reaction I.

*Example B.*—The brine used for dry hydrating and creaming had a specific gravity of 1.002 but contained 2.8 per cent of magnesium chloride. The cake could not be filtered in any practical length of time.

*Example C.*—The brine used for dry hydrating and creaming had a specific gravity of 1.062 but contained 0.4 per cent of magnesium chloride. As compared with normal practice, the filtering rate was halved, and the cake contained calcium chloride equivalent to 4.6 per cent of CaO, which is so high as to render the magnesia unacceptable for some purposes. It contained also 11.2 per cent of chlorine as soluble chlorides.

*Example D.*—The brine used for dry hydrating and creaming was a pure calcium chloride brine having a specific gravity of 1.015. The filtering rate was but 13 per cent of that stated hereinabove as being normally obtained in my process, and the cake contained calcium chloride equivalent to 5.4 per cent of CaO, and 12.2 per cent of chlorine as soluble chlorides, whereas for commercial acceptance it should carry not over about 1.25 per cent of CaO.

*Example E.*—The brine used for dry hydrating and creaming was pure calcium chloride having a specific gravity of 1.145. The filtering rate was halved, the cake contained calcium chloride equivalent to 4.2 per cent CaO, and 7.9 per cent of chlorine as soluble chlorides.

Examples B to E illustrate the critical nature of the concentration and purity of the $CaCl_2$ brine used for hydrating and creaming.

*Example F.*—The temperature in normal operation, as described above, varies in the precipitator from about 57° F. at the start to about 63° F. at the end, due to release of heat in the reactions. In this example the range was increased to from about 63° F. to 72° F., an average increase of about 7½° F. The filtering rate was 28 per cent of normal, and the cake contained calcium chloride equivalent to about 3 per cent CaO together with soluble chlorides equivalent to 5.33 per cent of chlorine. This clearly demonstrates the critical importance of temperature control in the precipitator.

*Example G.*—The density of the cycling brine was increased to 22 per cent of magnesium chloride and 6 per cent of calcium chloride. The filtering rate was reduced to about 20 per cent of normal. The cake contained 9.9 per cent of chlorine as soluble chlorides, with calcium chloride equivalent to about 4.3 per cent of CaO.

*Example H.*—The density of the cycling brine was decreased to 5.5 per cent of magnesium chloride and 1.5 per cent of calcium chloride. The filtering rate of the cake was about 25 per cent normal, and the cake contained 5.93 per cent of chlorine as soluble chlorides together with calcium chloride equivalent to 2.8 per cent of CaO.

Examples G and H show the importance of using for Reaction I an $MgCl_2$ brine of the kind described.

Microscopic examination, using polarized light, of the granular hydrated dolomite affords an explanation of the phenomena upon which the present invention is based. Such an examination shows that the granules are not single crystals but are made up of myriads of very small crystals, apparently one micron or less in size, which are cemented together to form the large grains. Although I have not definitely identified the cementing material, it is reasonable to suppose that it is a calcium oxychloride. Be that as it may, it is evident that some sort of a cementing material is present and that this is due to the particular type of brine used in the dry hydrating step.

Examination in the same way of the granular $Mg(OH)_2$ produced by Reaction I shows the same type of grains. It will be understood that even under the best conditions in the practice of my invention some small amount of $Mg(OH)_2$ will become dispersed, and in fact some very small crystals, one micron or less in size, may be seen in the microscope field together with an occasional cluster of these small crystals attached to the edges of large grains. These small crystals are presumably either ($Mg(OH)_2$ which has been dispersed from the large grains or is in the process of being dispersed.

These observations provide a basis for explaining my process. The reaction between $MgCl_2$ and $Ca(OH)_2$ (Reaction I) proceeds by penetration of the brine along the boundaries of the crystals which make up the large grains of hydrated dolomite. Such penetration permits complete decomposition of the $Ca(OH)_2$ and complete hydration of MgO present in the grains, but as these reactions proceed the cement which holds the crystals together is weakened. Hence if $MgCl_2$ is present in the steps of dry hydrating or of creaming the granular hydrated dolomite, its penetration along the crystal boundaries proceeds far enough to permit the small crystals of which the granules are composed to be dispersed to an extent such as to be objectionable because the product of the subsequent precipitation reaction will then be slow filtering and difficult to wash. On the other hand, if $MgCl_2$ is absent in the dry hydrating and creaming steps, the grains are formed with a strong cementing action resulting from the use of a specific type of pure $CaCl_2$ brine, and there being no penetration of $MgCl_2$ into the grains in these steps, the parent grains remain strong enough to resist the strong agitation used in the creaming step. Thus the steps of dry hydrating and creaming may be looked upon as necessary for forming and conditioning the grains so that they will resist dispersion when Reaction I is carried out.

When the cream, or slurry, of granular dolomite is introduced into the $MgCl_2$ brine in the precipitating step a reaction begins immediately by penetration and diffusion of $MgCl_2$ along the crystal boundaries. This weakens the cement so that the agitation must be gentle and the temperature held within the prescribed limits, otherwise enough of the crystals will be loosened and dispensed to interfere with settling and to make it impossible to filter at any practical rate. The present invention is the first in which these phenomena have been recognized and in which practical steps have been devised for controlling them in such manner as to render the underlying reactions applicable on a practical and economical basis.

The invention provides also, as indicated above, a process for regeneration of the brine formed in Reaction I, and this regenerating process may be used to prepare a rapid settling and free filtering precipitated calcium carbonate in a state of commercially acceptable purity. In accordance with this aspect of the invention the fines from air separator 6 (finer than 150 to 200 mesh) are withdrawn from bin 8 into a creamer 14 where they meet a portion of the brine overflow from thickener 11, the mixture being subjected to strong agitation to produce a lump-free flowable pulp. The solids content of this pulp is not critical, the important factor being to eliminate all lumps and provide a perfectly smooth cream, or slurry. On the basis stated above, creamer 14 would receive about 148 pounds per minute of fines from bin 8, and suitable results are had by feeding to the creamer 72 gallons per minute of the brine from thickener 11. This provides a slurry containing about 22 per cent of solids.

It will be observed that the feed to creamer 14 is somewhat greater than that to creamer 9. This is due to the necessity for manufacturing magnesium chloride in the carbonate branch to replace that which is retained by the magnesia filter cake.

A small portion of the slurry from creamer 14 is diverted to a precipitator 15 for a purpose to be described hereinafter.

Although it has been proposed to treat hydrated dolomite and the brine containing $CaCl_2$ with carbon dioxide to regenerate magnesium chloride brine in accordance with Reactions II and III, I have found that such a procedure is not productive of a precipitated carbonate that can be handled practically. I have discovered further that by effecting reaction between the dolomite and the brine from Reaction I so as to convert the entire content of hydrated lime to calcium chloride and then subjecting the reaction mixture to carbonation, the brine may be satisfactorily regenerated and the calcium carbonate produced settles rapidly and filters freely. To this end the balance of the slurry from creamer 14 is passed to a pre-carbonating mixer 16 where it meets the balance of the brine overflow from thickener 11 and the major portion of the filtrate from magnesia filter 12. This is preferably a three-stage mixer similar to precipitator 10. In mixer 16 reaction of hydrated lime present in the dolomite fines with magnesium chloride present in the cycling brine is completed. For the purposes of the invention there should be present at the end of the reaction about 5 per cent excess $MgCl_2$, or about 0.6 per cent of the brine. The calcium chloride content of the brine should be from 20 to 30 per cent in excess of the requirements of the carbonation reaction. The conversion of all the hydrated lime to calcium chloride and the presence of about the amount of magnesium chloride stated are necessary for producing, in the next step, a calcium carbonate of sufficient purity for commercial purposes and which can be separated in practical and economical manner from the mother liquor.

The slurry from the pre-carbonating mixer 16, which now consists of a suspension of $Mg(OH)_2$ in a brine containing calcium and magnesium chlorides at a pH of 9 to 10, and preferably between 9.3 to 9.5, showing substantial absence of $Ca(OH)_2$, then passes to a carbonator 17 into which there is passed the stack gas from rotary kiln 1, containing about 25 per cent of $CO_2$ by volume dry basis, for effecting Reaction II. Suitably the gas containing $CO_2$ is passed first through a spray cooler 18, then through an electrostatic precipitator 19, and thence to a blowing engine 20.

By providing suitable agitation in the carbonator to insure intimate contact between the gas and the slurry the carbonation reaction is about 94 to 97.5 per cent complete in about 80 to 100 minutes. At the end of the reaction the pH is about 5.25 to 6.0.

The calcium carbonate formed contains about 1 to not over about 2 per cent of MgO on the dry basis. It settles and filters in a satisfactory manner. The slurry from carbonator 17, amounting to about 313 gallons per minute and carrying about 9.4 per cent of solids, is settled in a thickener 21, preferably during about 24 hours. The underflow amounts to about 30 per cent, or 94 gallons per minute. It passes to a rotary vacuum filter 22 on which it is washed with about 93 gallons per minute of water. The production of dry solids from filter 22 is at the rate of about 310 pounds per minute, and I have found that about 1580 square feet of filter area is sufficient, which corresponds to about 0.2 pounds per square foot of drum area per minute. I prefer to regulate the rate of rotation of the filter drum so that the thickness of the cake will be from $\frac{1}{4}''$ to $\frac{5}{16}''$, but can operate successfully with cakes twice as thick as this.

The weakest one-third of the wash from filter 22 is passed, as described above, to filter 12 for washing the magnesia cake. The balance of the combined filtrate and wash is preferably passed through a clarifying filter 23, suitably of the pressure type, to remove the last trace of suspended solids. After clarifying it joins the overflow from thickener 21, which amounts to about 219 gallons per minute, so that the total flow is about 346 to 367 gallons per minute. Of this amount about 68 to 80 gallons per minute is water which has accumulated in the cycle and must be removed by evaporation. This is preferably done by diverting about 94 gallons per minute to a multiple effect evaporator 24, the balance being by-passed to meet the concentrated liquor from the last effect of the evaporator, which amounts to about 26 gallons per minute. The main stream, now amounting to about 287 gallons per minute, is then cooled to a maximum temperature of 60° F., and better of 55° F., to condition it for return to precipitator 10. To this end it may be passed to a forced draft cooler 25 of conventional type, and thence, if necessary, to a refrigerating apparatus 26, so that the brine is not over the temperature stated when it is introduced into precipitator 10.

The steam for the evaporator 24 may be bled from a turbo-generator 27 which may be used for generating all the power required and obtains its high pressure, high superheat steam from a boiler 28.

As stated hereinabove, the use of an abnormally large excess of magnesium chloride in effecting Reaction I is desirable not only in producing a freely filtering magnesia, but also in exerting the same effect in the carbonate branch, as exemplified by the high filtration rate represented by the foregoing data. To show this further, reference may be made to the following tests.

*Example I.*—The excess magnesium chloride in the magnesia branch was but 25 per cent. The carbonate cake could not be filtered in any practical length of time. This is due to the fact that insufficient magnesium chloride was present to convert all of the hydrated lime of the fines to calcium chloride.

*Example J.*—In this test the excess magnesium chloride in Reaction I was 57 per cent. The carbonate cake could be filtered at only 40 per cent of the rate stated above, and the water content of the cake was increased about 25 per cent. This is due to the reasons stated in connection with Example I.

Reaction I is substantially 100 per cent complete, but Reaction II, in carbonator 17, is only about 94 to 97½ per cent complete. If this disparity were not corrected calcium chloride would build up in the brine at the expense of magnesium chloride so that the reactions would ultimately cease. I have found, however, that this can be corrected easily by diverting a portion of the magnesia cake from filter 12 and introducing it into the carbonate branch, for instance into the pre-carbonating mixer 16. In the example being described this is done by passing per minute about 5.7 pounds, dry basis, of the magnesia cake to pre-carbonating mixer 16. In this way, or by returning more or less than 5.7 pounds per minute of magnesia cake to the carbonate branch, as may be required for the purpose, it is possible to control and maintain the necessary stable relation between the concentrations of magnesium and calcium chlorides at any given point in the cycle, which is obviously of major importance in the practice of a cyclic process of this type in order to prevent the process from becoming unworkable because of loss of magnesium chloride in the cycling brine in consequence of the condition stated.

Pure calcium chloride brine is necessary, as will be understood, in the practice of the invention for conducting the dry hydration in hydrator 3 and the creaming in creamer 9. The invention provides a simple and economical mode of producing such a brine in the cycle of the process. This is done by means of the portion of the slurry from creamer 14 which is diverted, as noted above, to a precipitator 15 which is similar to precipitator 10 and the pre-carbonator 16. In this example the feed amounts to 10 gallons of slurry per minute. There is added to the precipitator about 3.4 gallons per minute of the filtrate from filter 12 together with all of the wash water. The slurry feed is such as to provide about 10 per cent excess $Ca(OH)_2$ over the amount required to react with all of the $MgCl_2$ in the brine feed. In this manner all of the $MgCl_2$ carried by the brine is converted to $Mg(OH)_2$ with regeneration of a substantially pure calcium chloride brine fitted for use in the process. The slurry passes from precipitator 15 to a thickener 29 from which the underflow, amounting to about 36 to 38 gallons per minute, is returned to the pre-carbonator 16. The overflow from thickener 29 passes to a make-up tank 30 where calcium chloride is added in an amount corresponding to the loss in the cycle, i. e., the amount which is lost in the filter cakes. In this example this will amount to about 8.5 pounds per minute. The correct total amount of calcium chloride at this point can easily be controlled in any case by varying the mixture of filtrate and wash water from filter 12.

Proceeding in the manner described I have produced a calcined magnesia of the following analysis:

| | Per cent |
|---|---|
| MgO | 96.58 |
| CaO | 1.74 |
| $SiO_2$ | 0.84 |
| $R_2O_3$ | 0.84 | together with a calcium carbonate of the following analysis:

| | Per cent |
|---|---|
| CaO | 53.4 |
| MgO | 1.4 |
| $SiO_2$ | 0.1 |
| $Fe_2O_3$ | 0.1 |
| $Al_2O_3 + TiO_2$ | 0.1 |
| Alkalies | 0.2 |
| Ign. loss | 44.3 |

It will be understood that products of the foregoing analyses are satisfactory for the purposes to which those materials are put.

Although the invention has been described with reference to the dolomites of northwestern Ohio, it will be understood that it is equally applicable, with minor changes which will be understood by those skilled in the art, to other dolomites and magnesian limestones.

The introduction of sulfate into the cycle, as from the sulfur contained in the fuel used in kiln 1, should be avoided because it has an adverse effect upon the settling and filtering properties of the carbonate cake.

The method of making granular dead burned magnesite described above, which depends upon the activity of caustic magnesia made as disclosed herein, is being made the subject-matter of a separate application.

According to the provisions of the patent statutes, I have explained the principle and method of practicing my invention and have described what I now consider to represent its best embodiment. However, I desire to have it understood that, within the scope of the appended claims, the invention may be practiced otherwise than as specifically described.

I claim:

1. That method of producing magnesia and calcium carbonate from dolomite which comprises adding to calcined dolomite a calcium chloride brine substantially free from magnesium chloride to hydrate substantially all of the lime present and produce a dry product containing a high proportion of granular material, separating the hydrated material into a granular fraction and a fines fraction the particles of which average finer than those of said granular fraction, treating said granular fraction with a magnesium chloride brine in an amount to supply at least about 100 per cent excess magnesium chloride over that needed to react with the hydrated lime present in said fraction while maintaining the mixture at a temperature not over 65° F. and thereby precipitating hydrated magnesia in readily filterable form, separating said hydrated magnesia from the residual magnesium chloride-calcium chloride brine, and treating said residual brine and said fines with carbon dioxide to produce calcium carbonate and regenerate said magnesium chloride brine.

2. That method of producing magnesia and calcium carbonate from dolomite which comprises adding to caustic burned dolomite a calcium chloride brine of about 1.05 to 1.08 specific gravity that is substantially free from magnesium chloride to hydrate substantially all of the lime present and produce a dry product containing a high proportion of granular material, separating the hydrated material into a granular fraction and a fines fraction the particles of which average finer than those of said granular fraction, mixing said granular fraction with a magnesium chloride brine in an amount to supply at least about 105 per cent excess magnesium chloride over that needed to react with the hydrated lime present in said granular fraction while maintaining the mixture at a temperature not over 65° F. and thereby precipitating hydrated magnesia in readily filterable form, separating said hydrated magnesia from the residual magnesium chloride-calcium chloride brine, and treating said residual brine and said fines with carbon dioxide to produce calcium carbonate and regenerate said magnesium chloride brine.

3. That method of producing magnesia and calcium carbonate from dolomite which comprises adding to caustic burned dolomite a pure calcium chloride brine of about 1.05 to 1.08 specific gravity to hydrate substantially all of the lime present and produce a dry product containing a high proportion of granular material, separating the hydrated material into a granular fraction and a fines fraction the particles of which average finer than those of said granular fraction, mixing said granular fraction with a magnesium chloride brine, said $MgCl_2$ brine being of about 1.1 to 1.14 specific gravity and being in an amount to supply at least about 105 per cent excess magnesium chloride over that needed to react with the hydrated lime present in said granular fraction while maintaining the mixture at a temperature not over 65° F. and thereby precipitating hydrated magnesia in readily filterable form, separating said hydrated magnesia from the residual magnesium chloride-calcium chloride brine, and treating said residual brine and said fines with carbon dioxide to produce calcium carbonate and regenerate said magnesium chloride brine.

4. That method of producing magnesia and calcium carbonate from dolomite which comprises adding to caustic burned dolomite a calcium chloride brine of about 1.05 to 1.08 specific gravity and substantially free from magnesium chloride to hydrate substantially all of the lime present and produce a dry product containing a high proportion of granular material, separating the hydrated material into a granular fraction and a fines fraction the particles of which average finer than those of said granular fraction, mixing said granular fraction with a magesium chloride brine, said $MgCl_2$ brine containing $CaCl_2$ in an amount less than the $MgCl_2$, being of about 1.10 to 1.14 specific gravity, and being used in an amount to supply at least about 105 per cent excess magnesium chloride over that needed to react with the hydrated lime present in said granular fraction while maintaining the mixture at a temperature not over 65° F. and thereby precipitating hydrated magnesia in rapid setting and readily filterable form, separating said hydrated magnesia promptly from the residual magnesium chloride-calcium chloride brine, producing a creamed slurry from said fines and said residual brine, the amounts of the said fines and of said residual brine being so proportioned that substantially all of the lime of said fines is converted to calcium chloride and all but a small proportion of the magnesium chloride of the brine is precipitated as hydrated magnesia, treating said slurry with carbon dioxide and thereby precipitating readily filterable calcium carbonate and regenerating said magnesium chloride brine, separating the calcium carbonate from said regenerated brine, and returning the regenerated brine to treat a further amount of said granular fraction.

5. A process according to claim 4, the magnesium chloride concentration of said regenerated brine being maintained by adding to said second slurry a portion of said hydrated magnesia.

6. In a cyclic process of producing magnesia from dolomite in which the dolomite is calcined, dry hydrated, separating the dry hydrated material into a coarse fraction and a fine fraction the particles of which average finer than those of said coarse fraction, and said coarse fraction is reacted with a magnesium chloride brine to precipitate hydrated magnesia and produce an end brine containing a large surplus of unreacted magnesium chloride, the method of regenerating said magnesium chloride brine for recycling to treat a further amount of the hydrated dolomite which comprises treating said fine fraction with said end brine from said reaction in amounts to reduce the surplus $MgCl_2$ to a small amount and produce a slurry the solids content of which is substantially all magnesia, then treating said slurry with carbon dioxide gas to precipitate calcium carbonate and regenerate said magnesium chloride brine, and separating the regenerated brine from said carbonate and recycling it.

7. A process according to claim 6, the calcium chloride content of the slurry being such that said regenerated brine contains about 3 per cent of calcium chloride about 20 per cent in excess of that needed for the carbonation reaction.

8. In a cyclic process of making magnesia from dolomite by reacting calcined dolomite with an $MgCl_2$ brine in a magnesia branch to precipitate hydrated magnesia in which the brine in a carbonate branch is regenerated by treating the mother liquor from said reaction with calcined dolomite and carbon dioxide with precipitation of calcium carbonate, that method of maintaining a stable relation between $MgCl_2$ and $CaCl_2$ in the cycling brine which comprises passing solid hydrated magnesia in an amount to compensate for normal reduction of magnesium chloride relative to calcium chloride from the magnesia branch to the carbonate branch and there contacting it with said mother liquor prior to carbonation.

9. A process according to claim 3, said granular fraction being substantially all particles from about minus 65 to plus 150 to 200 mesh, and said fines being substantially all particles of minus 150 to 200 mesh.

10. That method of producing magnesia and calcium cabonate from dolomite which comprises adding to caustic burned dolomite a calcium chloride brine of about 1.05 to 1.08 specific gravity that is substantially free from magnesium chloride to hydrate substantially all of the lime present and produce a dry product containing a high proportion of granular material, separating the hydrated material into a granular fraction and a fines fraction the particles of which average finer than those of said granular fraction, mixing said granular fraction with a further amount of said brine to produce a creamed slurry of high solids content, mixing said slurry with a magnesium chloride brine in an amount to supply at least about 105 per cent excess magnesium chloride over that needed to react with the hydrated lime present in said slurry while maintaining the mixture at a temperature not over 65° F. and thereby precipitating hydrated magnesia in readily filterable form, separating said hydrated magnesia from the residual magnesium chloride-calcium chloride brine, and treating said residual brine and said fines with carbon dioxide to produce calcium carbonate and regenerate said magnesium chloride brine.

11. That method of producing magnesia and calcium carbonate from dolomite which comprises adding to caustic burned dolomite a calcium chloride brine of about 1.05 to 1.08 specific gravity and substantially free from magnesium chloride to hydrate substantially all of the lime present and produce a dry product containing a high proportion of granular material, separating the hydrated material into a graular fraction and a fines fraction the particles of which average finer than those of said granular fraction, mixing said granular fraction with a further amount of said brine to produce a creamed slurry of high solids content, mixing said slurry with a magnesium chloride brine containing CaCl₂ in an amount less than the MgCl₂ being of about 1.10 to 1.14 specific gravity, and being used in an amount to supply at least about 105 per cent excess magnesium chloride over that needed to react with the hydrated lime present in said slurry while maintaining the mixture at a temperature not over 65° F. and thereby precipitating hydrated magnesia in rapid settling and readily filterable form, separating said hydrated magnesia from the residual magnesium chloride-calcium chloride brine, producing a second creamed slurry from said fines and said residual brine, the amounts of said fines and of said residual brine being so proportioned that substantially all of the lime of said fines is converted to calcium chloride and all but a small proportion of the magnesium chloride of the brine is precipitated as hydrated magesia, treating said second slurry with carbon dioxide and thereby precipitating readily filterable calcium carbonate and regenerating said magnesium chloride brine, separating the calcium carbonate from said regenerated brine, and returning the regenerated brine to treat a further amount of the first-named slurry.

12. In a cyclic process of producing magnesia from dolomite in which the dolomite is caustic burned, hydrated, and reacted with a magnesium chloride brine to precipitate hydrated magnesia, the steps comprising dry hydrating the burned dolomite with a CaCl₂ brine substantially free from MgCl₂ and of about 1.05 to 1.08 specific gravity to hydrate substantially all of the CaO of the dolomite, separating the hydrated material into a granular fraction and a fines fraction the particles of which average smaller than those of said granular fraction, mixing the granular fraction of hydrated material with a further amount of said CaCl₂ brine to produce a creamed slurry of high solids content, and effecting said reaction with a magnesium chloride brine carrying about 11 per cent of MgCl₂ and 3 per cent of CaCl₂.

13. In a cyclic process of making magnesia and calcium carbonate from dolomite in which calcined dolomite is reacted in a magnesia branch of the process with a magnesium chloride brine to precipitate hydrated magnesia and produce an end brine containing calcium chloride, and said end brine is reacted in a carbonate branch of the process with another portion of calcined dolomite and carbon dioxide to produce calcium carbonate and regenerate said magnesium chloride brine, the steps of dry hydrating the calcined dolomite, prior to said reactions, with a calcium chloride brine substantially free from magnesium chloride so that a product containing granular hydrated material is produced, grinding the graular material to below a predetermined particle size and separating said ground material into a granular portion and a fines portion the particles of which average finer than those of said graular portion, passing said granular portion to said magnesia branch, and passing said fines portion to said carbonate branch.

14. A process according to claim 13, said granular fraction being substantially all particles from about minus 65 to plus 150 to 200 mesh, and said fines being substantially all particles of minus 150 to 200 mesh.

15. A process according to claim 13, said granular portion being mixed with calcium chloride brine substantially free from magnesium chloride to form a creamed slurry of high solids content before being reacted with the magnesium chloride brine in said magnesia branch.

16. A process according to claim 13 in which the calcium chloride brine used for dry hydrating the dolomite is of about 1.05 to 1.08 specific gravity.

17. A process according to claim 13 in which the calcium chloride brine used for hydrating the dolomite is produced by reacting a portion of said end brine with hydrated dolomite calcine in an amount such as to convert all of the magnesium chloride content of the end brine to hydrated magnesia and produce said calcium chloride brine.

18. In a process of making precipitated magnesia by the reaction of

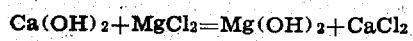

$$Ca(OH)_2 + MgCl_2 = Mg(OH)_2 + CaCl_2$$

the improvement which comprises supplying the MgCl₂ as a brine containing about 11 per cent of MgCl₂ and the brine being supplied in an amount to provide at least 100 per cent MgCl₂ over the requirement of the said reaction, and the reaction being carried out at a temperature not over 65° F.

19. In a cyclic process of making magnesia from dolomite by reacting one portion of calcined dolomite with MgCl₂ brine in a magnesia branch of the process to precipitate hydrated magnesia said magnesium chloride brine being used in an amount to supply at least about 100 per cent excess magnesium chloride over that needed to react with the hydrated lime present in said portion of calcined dolomite, and in which process the MgCl₂ brine used in the said magnesia branch is regenerated by treating the end brine from the said reaction with a second substantially equal portion of calcined dolomite and carbon dioxide with precipitation of calcium carbonate, that method of producing the calcium carbonate in a rapidly settling and free filtering form which comprises treating said second portion of calcined dolomite with said end brine from the magnesia branch in an amount to react with all of the lime in said second portion of dolomite and provide a slight excess of MgCl₂ to thereby provide a slurry of Mg(OH)₂ in a brine containing predominantly CaCl₂, and then carbonating the said slurry.

20. A process according to claim 19 in which said end brine is added to said second portion of calcined dolomite in an amount such that the said slurry has a pH of 9.0 to 9.5 before beginning carbonation.

21. That method of producing magnesia and calcium carbonate from dolomite which comprises adding to caustic burned dolomite a calcium chloride brine substantially free from magnesium chloride to hydrate substantially all of the lime present and produce a dry product containing a high proportion of granular material, separating the hydrated material into a granular fraction and a fines fraction the particles of which average finer than those of said granular fraction, mixing said granular fraction with a magnesium chloride brine containing CaCl₂ in an amount less than the MgCl₂ and in an amount to supply at least about 105 per cent excess magnesium chloride over that needed to react with the hydrated lime present in said slurry and thereby precipitating hydrated magnesia in rapid settling and readily filterable form, separating said hydrated magnesia from the residual magnesium chloride-calcium chloride brine, producing a second creamed slurry from said fines and said residual brine the amounts of said fines and of said residual brine being so proportioned that substantially all of the lime of said fines is converted to calcium chloride and all but a small proportion of the magnesium chloride of the brine is precipitated as hydrated magnesia, treating said second slurry with carbon dioxide and thereby precipitating readily filterable calcium carbonate and regenerating said magnesium chloride brine, separating the calcium carbonate from said regenerated brine, and returning the regenerated brine to treat a further amount of the first-named slurry.

22. In a method of producing magnesia and calcium carbonate from dolomite which comprises mixing calcined dolomite with a calcium chloride brine substantially free from magesium chloride to produce a dry hydrated product, reacting a portion of the hydrated material in a magnesia branch with magnesium chloride brine to precipitate hydrated magnesia, and in which another portion of said hydrated material is treated with the end brine from said reaction and with carbon dioxide to precipitate calcium carbonate, the method of producing said calcium chloride brine which consists in reacting a portion of said end brine with part of said another portion of hydrated material in an amount such as to convert all of the magnesium chloride in the end brine to hydrated magnesia and produce said calcium chloride brine, recovering the calcium chloride brine and passing the residual slurry to said carbonation step.

23. In a cyclic process of making magnesia and calcium carbonate from dolomite in which calcined dolomite is reacted in a magnesia branch of the process with a magnesium chloride brine to precipitate hydrated magnesia and produce an end brine containing calcium chloride, and said end brine is reacted in a carbonate branch of the process with another portion of calcined dolomite and carbon dioxide to produce calcium carbonate and regenerate said magnesium chloride brine, the steps of dry hydrating the calcined dolomite, prior to said reactions, with a calcium chloride brine so that a product containing granular hydrated material is produced, grinding the granular material to below a predetermined particle size and separating said ground material into a granular portion and a fines portion the particles of which average finer than those of said granular portion, passing said granular portion to said magnesia branch, and passing said fines portion to said carbonate branch.

24. A process for producing magnesia hydrate from dolomite, the steps of which comprises calcining the dolomite, dry hydrating the calcined dolomite with a calcium chloride brine so as to produce a granular product, grinding and separating said product into a granular fraction and a fines fraction, said granular fraction being between approximately 65 and approximately 200 mesh and a major portion thereof being coarser than 150 mesh, reacting said granular fraction with a magnesium chloride brine so as to produce a readily filterable magnesium hydroxide, and separating magnesium hydroxide from the calcium chloride solution produced by the reaction.

ROBERT D. PIKE.

CERTIFICATE OF CORRECTION.

Patent No. 2,373,911.  April 17, 1945.

ROBERT D. PIKE.

It is hereby certified that error appears in the printed specification of the above numbered patent requiring correction as follows: Page 4, first column, line 42, for "magnesium" read --magnesia--; page 9, first column, line 46, claim 4, for "setting" read --settling--; and second column, lines 18 and 19, claim 7, strike out the words "about 20 per cent in excess of that needed for the carbonation reaction"; line 75, claim 11, and page 10, first column, lines 62 and 66, claim 13, for "graular" read --granular--; and that the said Letters Patent should be read with this correction therein that the same may conform to the record of the case in the Patent Office.

Signed and sealed this 31st day of July, A. D. 1945.

Leslie Frazer (Seal)  Acting Commissioner of Patents.

chloride-calcium chloride brine, producing a second creamed slurry from said fines and said residual brine the amounts of said fines and of said residual brine being so proportioned that substantially all of the lime of said fines is converted to calcium chloride and all but a small proportion of the magnesium chloride of the brine is precipitated as hydrated magnesia, treating said second slurry with carbon dioxide and thereby precipitating readily filterable calcium carbonate and regenerating said magnesium chloride brine, separating the calcium carbonate from said regenerated brine, and returning the regenerated brine to treat a further amount of the first-named slurry.

22. In a method of producing magnesia and calcium carbonate from dolomite which comprises mixing calcined dolomite with a calcium chloride brine substantially free from magesium chloride to produce a dry hydrated product, reacting a portion of the hydrated material in a magnesia branch with magnesium chloride brine to precipitate hydrated magnesia, and in which another portion of said hydrated material is treated with the end brine from said reaction and with carbon dioxide to precipitate calcium carbonate, the method of producing said calcium chloride brine which consists in reacting a portion of said end brine with part of said another portion of hydrated material in an amount such as to convert all of the magnesium chloride in the end brine to hydrated magnesia and produce said calcium chloride brine, recovering the calcium chloride brine and passing the residual slurry to said carbonation step.

23. In a cyclic process of making magnesia and calcium carbonate from dolomite in which calcined dolomite is reacted in a magnesia branch of the process with a magnesium chloride brine to precipitate hydrated magnesia and produce an end brine containing calcium chloride, and said end brine is reacted in a carbonate branch of the process with another portion of calcined dolomite and carbon dioxide to produce calcium carbonate and regenerate said magnesium chloride brine, the steps of dry hydrating the calcined dolomite, prior to said reactions, with a calcium chloride brine so that a product containing granular hydrated material is produced, grinding the granular material to below a predetermined particle size and separating said ground material into a granular portion and a fines portion the particles of which average finer than those of said granular portion, passing said granular portion to said magnesia branch, and passing said fines portion to said carbonate branch.

24. A process for producing magnesium hydrate from dolomite, the steps of which comprises calcining the dolomite, dry hydrating the calcined dolomite with a calcium chloride brine so as to produce a granular product, grinding and separating said product into a granular fraction and a fines fraction, said granular fraction being between approximately 65 and approximately 200 mesh and a major portion thereof being coarser than 150 mesh, reacting said granular fraction with a magnesium chloride brine so as to produce a readily filterable magnesium hydroxide, and separating magnesium hydroxide from the calcium chloride solution produced by the reaction.

ROBERT D. PIKE.

---

CERTIFICATE OF CORRECTION.

Patent No. 2,373,911.            April 17, 1945.

ROBERT D. PIKE.

It is hereby certified that error appears in the printed specification of the above numbered patent requiring correction as follows: Page 4, first column, line 42, for "magnesium" read --magnesia--; page 9, first column, line 46, claim 4, for "setting" read --settling--; and second column, lines 18 and 19, claim 7, strike out the words "about 20 per cent in excess of that needed for the carbonation reaction"; line 75, claim 11, and page 10, first column, lines 62 and 66, claim 13, for "graular" read --granular--; and that the said Letters Patent should be read with this correction therein that the same may conform to the record of the case in the Patent Office.

Signed and sealed this 31st day of July, A. D. 1945.

Leslie Frazer (Seal)           Acting Commissioner of Patents.

CERTIFICATE OF CORRECTION.

Patent No. 2,373,911. April 17, 1945.

ROBERT D. PIKE.

It is hereby certified that error appears in the printed specification of the above numbered patent requiring correction as follows: Page 4, first column, line 42, for "magnesium" read --magnesia--; page 9, first column, line 46, claim 4, for "setting" read --settling--; and second column, lines 18 and 19, claim 7, strike out the words "about 20 per cent in excess of that needed for the carbonation reaction"; line 75, claim 11, and page 10, first column, lines 62 and 66, claim 13, for "graular" read --granular--; and that the said Letters Patent should be read with this correction therein that the same may conform to the record of the case in the Patent Office.

Signed and sealed this 14th day of August, A. D. 1945.

Leslie Frazer (Seal) First Assistant Commissioner of Patents.